L. RANK.
Anti-Friction Journal-Bearing.
No. 212,744. Patented Feb. 25, 1879.
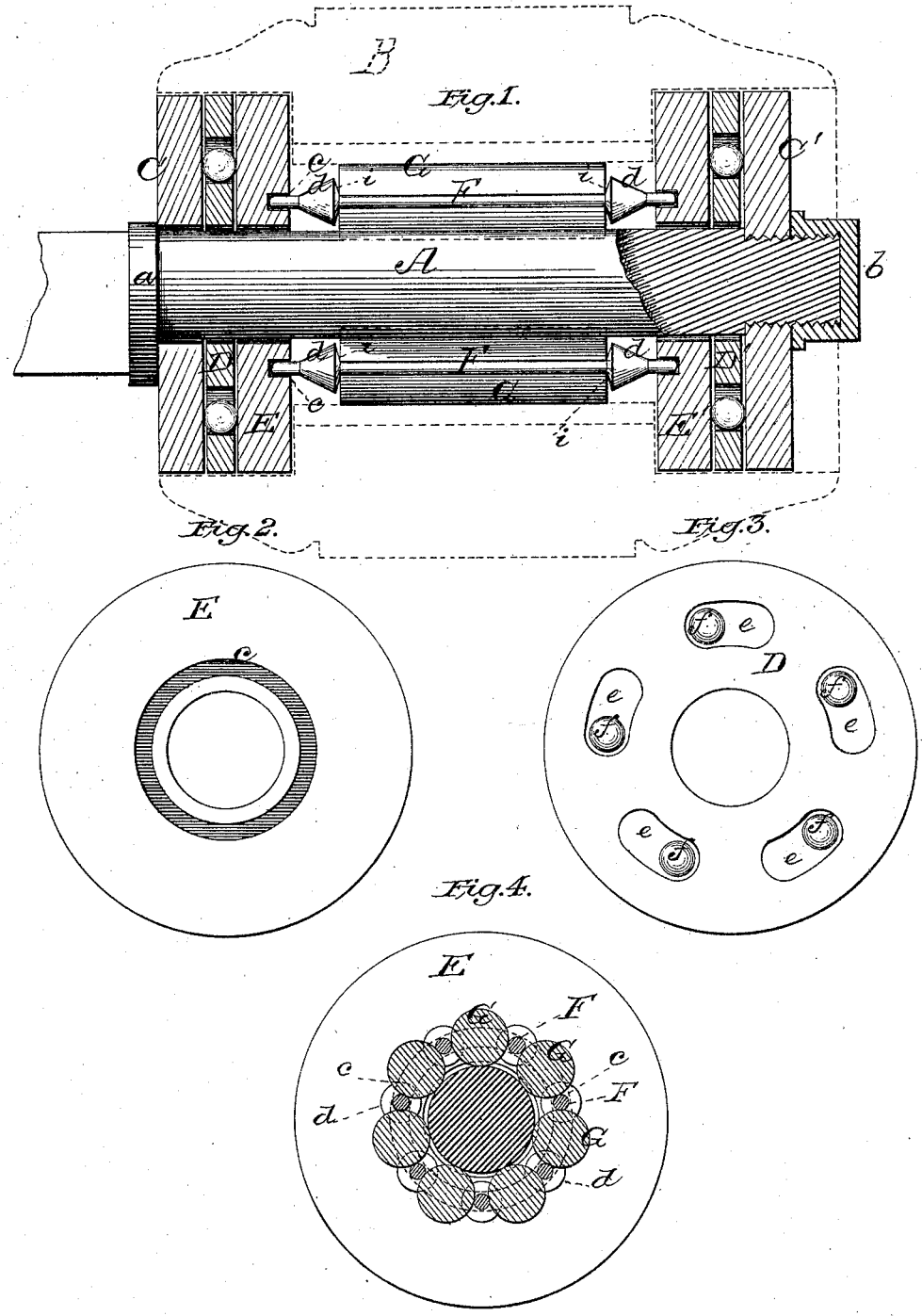

UNITED STATES PATENT OFFICE.

LORENZO RANK, OF OSWEGO, ILLINOIS.

IMPROVEMENT IN ANTI-FRICTION JOURNAL-BEARINGS.

Specification forming part of Letters Patent No. 212,744, dated February 25, 1879; application filed January 15, 1879.

*To all whom it may concern:*

Be it known that I, LORENZO RANK, of Oswego, in the county of Kendall and State of Illinois, have invented a new and valuable Improvement in Anti-Friction Roller-Bearings; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal central section of my invention; and Figs. 2, 3, and 4 are details.

This invention has relation to improvements in anti-friction bearings for vehicle-axles; and the nature of the invention consists in combining, with an axle-arm and a hub, large rollers interposed between the journal and box, smaller rollers between the said large rollers, and shouldered to hold them in place, collars applied upon the axle at each end of the small rollers and annularly grooved to receive the ends thereof, retainer-rings on the axle-arm at each end of the hub, and rings between the retainer and grooved rings, having spaced perforations and balls in said perforations, as will be hereinafter more fully set forth.

In the annexed drawings, the letter A designates the spindle of a vehicle-axle, separated from the body thereof by a collar or shoulder, $a$, and B designates the wheel-hub. (Indicated by dotted lines, Fig. 1.)

Bearing respectively against the shoulder $a$ and nut $b$ are rings C C', the former being at the inner, and the latter at the outer, end of the hub, as shown in Fig. 1. These rings usually turn loosely around the axle-arm, but may be fixed thereto, if I so elect.

Inside of rings C C' are other rings, D D', and inside of the latter are still other rings, E E'. These latter are provided with annular grooves $c$, in which are received the ends of small rollers F, having the enlarged shoulders $d$.

Between the rollers F are arranged the large rollers G, of sufficient diameter to completely fill the space between the axle-box and spindle and provide a rolling bearing. The rollers G are included between the shoulders $d$ of the smaller rollers F, and are maintained in place thereby.

In order to prevent the ends of the rollers G from creating undue friction with the shoulders $d$, the latter are beveled or rounded off, as shown at $i$.

As shown in Fig. 4, the rollers F and G alternate with each other, and completely inclose the journal A, the perimeters of the rollers G being tangential to that of the journal and to those of the smaller rollers F. The ends of these rollers F being in the grooves $c$ of rings E E', and their shoulders $d$ holding the large rollers G against endwise displacement, these rollers are incapable of being disarranged relative to each other or to the journal.

The middle rings, D D', above mentioned, are provided with holes $e$ at regular intervals, in which are placed the balls $f$. Their diameter is slightly greater than the thickness of the rings D D' aforesaid; consequently they project at each side thereof, and afford a rolling bearing to the rings E E', by which means end friction is reduced to a minimum.

The device above mentioned is secured in place by the nut $b$. In its essential parts it is applicable to all sorts of journals and rotating machinery of suitable size to great advantage.

I am aware that a rolling support for machine-journals is not new; hence I make no claim to such invention, broadly.

What I claim as new, and desire to secure by Letters Patent, is—

1. The combination, with the journal A and hub B, of the rings E E', having annular grooves $c$, the small rollers F, having end shoulders, $d$, and their ends engaged in said grooves, and the intermediate large rollers, G, between the said shoulders, tangential to rollers F, the hub, and journal, substantially as specified.

2. The combination, with the journal A and the end rings, C C', the inner grooved rings, E E', and the intermediate perforated rings, D D′, and balls $f$, of the small rollers F, having end shoulders, $d$, and journals engaged in the grooves of the inner rings, and the alternate large rollers G, tangential to the hub, the journal, and the small rollers, and kept in place endwise by the shoulders of the latter, substantially as specified.

In testimony that I claim the above I have hereunto subscribed my name in the presence of two witnesses.

LORENZO RANK.

Witnesses:
L. N. HALL,
COLVIN PEARCE.